United States Patent
Harris et al.

(10) Patent No.: US 10,524,155 B2
(45) Date of Patent: Dec. 31, 2019

(54) MULTI SUBSCRIPTION NETWORK PRIORITIZATION

(71) Applicant: NOKIA SOLUTIONS AND NETWORKS OY, Espoo (FI)

(72) Inventors: John Harris, Whitefish Bay, WI (US); Heli Katja Marjaana Silvennoinen, Espoo (FI); Mika Forssell, Tolkkinen (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 89 days.

(21) Appl. No.: 15/625,203

(22) Filed: Jun. 16, 2017

(65) Prior Publication Data

US 2017/0367001 A1 Dec. 21, 2017

(30) Foreign Application Priority Data

Jun. 17, 2016 (EP) .................................... 16175090

(51) Int. Cl.

| H04W 28/02 | (2009.01) |
| H04L 12/14 | (2006.01) |
| H04W 72/04 | (2009.01) |
| H04W 72/08 | (2009.01) |
| H04M 15/00 | (2006.01) |
| H04L 12/911 | (2013.01) |
| H04L 12/24 | (2006.01) |
| H04W 4/24 | (2018.01) |
| H04W 8/18 | (2009.01) |
| H04W 8/20 | (2009.01) |

(52) U.S. Cl.
CPC ..... H04W 28/0215 (2013.01); H04L 12/1407 (2013.01); H04L 41/0893 (2013.01);
(Continued)

(58) Field of Classification Search
None
See application file for complete search history.

(56) References Cited

U.S. PATENT DOCUMENTS 9,167,592 B1 10/2015 Hsu et al.
2012/0059943 A1* 3/2012 Castro Castro ......... H04L 12/14
709/227
(Continued)

FOREIGN PATENT DOCUMENTS

EP 2 816 792 A1 12/2014
JP 2006261894 A 9/2006
(Continued)

OTHER PUBLICATIONS

European Search Report application No. 16175090.6 dated Aug. 18, 2016.
(Continued)

*Primary Examiner* — Saumit Shah
(74) *Attorney, Agent, or Firm* — Squire Patton Boggs (US) LLP

(57) ABSTRACT

Various communication systems may benefit from appropriate prioritization of users and/or devices. For example, wireless communication systems may benefit from multi-subscription network prioritization, such as systems for prioritizing subscribers with multiple subscriptions that are using fewer devices than they have subscriptions. A method can include determining that a device is associated with a plurality of subscriptions. The method can also include determining at least one related device is not in use, wherein the at least one related device is associated with same plurality of subscriptions. The method can further include assigning a higher priority to the device based on the determinations that the device has the plurality of associated subscriptions and has at least one related device not in use.

11 Claims, 2 Drawing Sheets

(52) U.S. Cl.
CPC .......... *H04L 47/821* (2013.01); *H04M 15/58* (2013.01); *H04M 15/66* (2013.01); *H04M 15/7652* (2013.01); *H04M 15/77* (2013.01); *H04M 15/785* (2013.01); *H04W 4/24* (2013.01); *H04W 8/18* (2013.01); *H04W 72/048* (2013.01); *H04W 72/085* (2013.01); *H04W 8/186* (2013.01); *H04W 8/205* (2013.01); *H04W 28/0226* (2013.01)

(56) References Cited

U.S. PATENT DOCUMENTS

| | | | |
|---|---|---|---|
| 2012/0117235 A1 | 5/2012 | Castro Castro et al. | |
| 2013/0258849 A1 | 10/2013 | Sharma et al. | |
| 2014/0378094 A1* | 12/2014 | Gillick | H04M 15/7652 455/406 |
| 2016/0373590 A1* | 12/2016 | Oltmanns | H04L 12/1407 |

FOREIGN PATENT DOCUMENTS

| | | |
|---|---|---|
| KR | 20110030506 A | 3/2011 |
| WO | 2009143900 A1 | 12/2009 |
| WO | 2015/161361 A1 | 10/2015 |

OTHER PUBLICATIONS

Japanese Notification of Reason(s) for Rejection application No. 2017-118721 dated Jul. 23, 2018.

Oct. 19, 2018 Office Action issued in Korean Patent Application No. 2017-0076889.

Korean Office Action corresponding to Appln. No. 10-2017-0076889, dated Apr. 19, 2019.

Jan. 28, 2019 Office Action issued in Japanese Patent Application No. 2017-118721.

* cited by examiner

MULTI SUBSCRIPTION NETWORK PRIORITIZATION

BACKGROUND

Field

Various communication systems may benefit from appropriate prioritization of users and/or devices. For example, wireless communication systems may benefit from multi-subscription network prioritization, such as systems for prioritizing subscribers with multiple subscriptions that are using fewer devices than they have subscriptions.

Description of the Related Art

Operators may encounter challenges when seeking to increase revenues by charging for higher levels of wireless quality of service (QoS), for example, where subscribers use a model where they pay in return for receiving higher levels of QoS.

For example, application (app) development application programming interfaces (APIs) and smart phones may not enable apps to utilize such policy and charging rules function (PCRF) based mechanisms. Additionally, billing plans may be composed of a flat number of best effort bytes. This is simple from the end consumer perspective.

In other words, typical subscribers may pay for a fixed number of bytes per month, where traffic is all over best effort services, and does not utilize the PCRF based QoS mechanisms.

In other words, this may present challenges for operators seeking to further monetize subscribers by getting them to pay more in order to get better performance, i.e. difficulty in getting subscribers into the mode of paying for performance.

Operators may drive additional revenue by selling additional subscriptions to each subscriber. For example: a paying subscriber may pay for multiple subscriptions, for example for family members, phones, smart watches, internet of things (IoT) health solutions such as heart rate or movement monitors, IoT in the home and office, connected cars, tablets, and so on. Similarly, enterprises typically have numerous subscriptions. Airborne wireless communication solutions can also increase the likelihood of communication among devices.

Other cooperative subscription groupings may also be based upon the user equipment (UE) operating system (OS) or social or professional enterprise-like network affiliations.

These groups of devices are increasingly communicating with one another. For example, a smart watch may be almost completely reliant on a phone from the same manufacturer. Such communication gives these groups of devices the ability to decide whether to funnel multiple transfers across a single device. Such a choice permits consolidation of transfers from a group of devices.

UEs may save battery life if a single UE among a group of UEs performs a transfer. For example, such an approach may cut the current drain caused by a total transfer size by a factor of 2, where one device performs the entire transfer instead of having multiple (e.g. 4) devices perform separate transfers. However, current networks incentivize subscribers to avoid consolidating transfers onto a smaller number of devices, as this may reduce the overall bit rate achieved. As a result, this incentivizes subscribers to waste both battery life and network resources.

In addition, devices are increasingly communicating using multiple technologies, such as LTE+Wi-Fi or other cellular communication plus wireless local area network communication. This is a mechanism where a single device makes simultaneous use of an additional radio frequency (RF) technology at that same subscriber device to boost performance.

It is possible that even a single UE could utilize multiple subscriptions to obtain higher data rates, in order to extract higher data rates from a network. For example, commercial devices are available where a single UE can have multiple subscriptions or SIM cards. Thus, a single device may be configured to represent itself to the cellular network as multiple different radio resource control (RRC) connected cellular devices. This may become increasingly feasible with UEs utilizing software-defined networking (SDN).

SUMMARY

According to a first embodiment, a method can include determining that a device is associated with a plurality of subscriptions. The method can also include determining at least one related device is not in use, wherein the at least one related device is associated with same plurality of subscriptions. The method can further include assigning a higher priority to the device based on the determinations that the device has the plurality of associated subscriptions and has at least one related device not in use.

In a variant, the determining that the device is associated with a plurality of subscriptions can include determining that the device is assigned to a subscriber having a plurality of subscriptions.

In a variant, the subscriber can be an individual subscriber or an enterprise subscriber.

In a variant, the at least one related devices can be determined not to be in use when the at least one related device is not actively communicating.

In a variant, the subscriptions can be wireless subscriptions.

In a variant, the assigning the higher priority can include assigning a higher quality of service.

In a variant, the method can include determining that the at least one related device is in a same geographic area as the device. In this variant, the assigning the higher priority can be further contingent on the determination that the at least one related device is in the same geographic area as the device.

In a variant, the method can be performed by at least one of a policy and charging rules function or an entitlement server.

According to a second embodiment, an apparatus can include means for performing the method according to the first embodiment in any of its variants. For example, the apparatus can include means for determining that a device is associated with a plurality of subscriptions. The apparatus can also include means for determining at least one related device is not in use, wherein the at least one related device is associated with same plurality of subscriptions. The apparatus can further include means for assigning a higher priority to the device based on the determinations that the device has the plurality of associated subscriptions and has at least one related device not in use.

According to a third embodiment, an apparatus can include at least one processor and at least one memory including computer program code. The at least one memory and the computer program code can be configured to, with the at least one processor, cause the apparatus at least to perform the method according to the first embodiment, in any of its variants. For example, the at least one memory and the computer program code can be configured to, with the at least one processor, cause the apparatus at least to determine that a device is associated with a plurality of subscriptions. The at least one memory and the computer program code can also be configured to, with the at least one processor, cause the apparatus at least to determine at least one related device is not in use, wherein the at least one related device is associated with same plurality of subscriptions. The at least one memory and the computer program code can further be configured to, with the at least one processor, cause the apparatus at least to assign a higher priority to the device based on the determinations that the device has the plurality of associated subscriptions and has at least one related device not in use.

BRIEF DESCRIPTION OF THE DRAWINGS

For proper understanding of the invention, reference should be made to the accompanying drawings, wherein.

DETAILED DESCRIPTION

Figure 1:
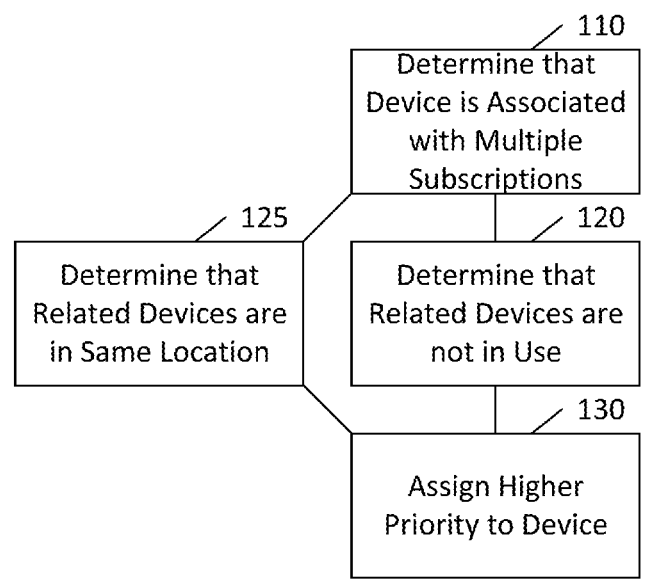
FIG. 1 illustrates a method according to certain embodiments.

Certain embodiments may provide a way of encouraging monetization through increased pay-for-performance. For example, certain embodiments may further monetize subscribers by getting them to pay more in order to get better performance. This may contrast with the conventional situation in which operators may not have been able to get subscribers into the mode of paying for performance.

Certain embodiments provide a mechanism which enables automatically shifting subscribers into the mode of paying for performance. For example, certain embodiments may automatically shift subscribers which purchase multiple wireless subscriptions (for example, for their watch, their car, their kids, their enterprise, their fitness tracker, and so on) to a plan where they automatically start to have a better wireless experience because they have purchased these additional subscriptions. Incentivize subscribers may be able to purchase additional subscriptions, to further accentuate this pay-for-performance benefit.

Current network best effort solutions may not appropriately incentivize subscribers to purchase additional subscriptions. For example, if five different devices are owned by a single subscriber or enterprise or group, each of the five devices can have a cellular subscription. Conventionally, best effort bandwidth is allocated on a "per subscriber basis."

If one of the five devices performs a transfer in a cell then that subscriber may achieve X Mbps. However, if all five of the subscriber's devices started downloading at the same time, then the subscriber may receive a total of ~5*X Mbps.

However, by using the mechanism according to certain embodiments, these inefficiencies can be avoided and fuller monetization of subscribers may be enabled by incentivizing subscribers to purchase additional subscriptions.

According to certain embodiments, a user can have multiple subscriptions, and an operator can reward the user for appropriate use of these multiple subscriptions. For example, when a user uses one device, an operator PCRF can know the total bandwidth the user is paying for, for example five mobile broadband subscriptions. The operator can top up the peak speed of one device when the other four devices are inactive. The result can be a better user experience where subscribers are increasingly owning multiple subscriptions, while also enabling such subscribers to efficiently capture further QoE benefits.

Furthermore, by offering such a solution, a network may encourage subscribers to efficiently utilize wireless network resources, for example by creating a minimum number of simultaneous transfers to each of their subscriber devices in order to achieve faster transfer speeds. For example, rather than each device downloading the content it needs directly from the network over each device's connection, one device of a group may download the content from the network and then may distribute the appropriate portion of content amongst the group using, for example, a device to device connection.

In certain embodiments, a network element such as a charging system, an entitlement server and/or PCRF can determine that a subscriber has multiple (for example, X) subscriptions that are not currently being used for a transfer. In response to determining that X is larger, the network can utilize the PCRF to cause the UE/transfer to be provided with a higher level (or priority) of QoS, for example a higher priority best effort services, or a higher ($X*(1+W)$ times larger) aggregate maximum bit rate (AMBR) or nominal bit rate (NBR). The higher level of QoS may, for example, provide a data rate which consumes the same amount of RF resources as would have been the case if X different subscribers had created X separate transfers. As a result, the data rate provided may be larger than the UE could have achieved if it had performed X separate transfers. This may be done because each separate transfer incurs a fixed amount of overhead per device performing a transfer. These resources (corresponding to the W factor above) can now also be used to enable a yet faster transfer because there is only a single transfer and thus the overhead for all but one of the X transfers can be avoided.

The QoS enhancement for multi-subscription subscribers, according to certain embodiments, could optionally be limited to the subscriber's devices that are in the same approximate location as the other devices with corresponding subscriptions. In such case, the network can be particularly incentivized to encourage subscribers to consolidate transfers across devices, as the UEs can already capture/achieve a higher data rate where the multiple devices perform separate transfers.

Thus, in certain embodiments, a user can be rewarded for appropriate use of multiple subscriptions. For example, the operator PCRF or other network entity can know than a user has, for example, five mobile broadband subscriptions. Moreover, the operator PCRF or other network entity can determine that the subscriber is only using a single device. Thus, the operator can top up the peak speed of the one device based on the other devices being inactive. The result may be a better user experience through owning multiple subscriptions.

FIG. 1 illustrates a method according to certain embodiments. As shown in FIG. 1, the method can include, at 110, determining that a device is associated with a plurality of subscriptions. For example, the device may be assigned to a subscriber and the subscriber may have several or numerous subscriptions. For example, the subscriber may be an individual subscriber or an enterprise subscriber. The enterprise subscriber can broadly include a group subscription as large as a company having hundreds of thousands, millions, or more of associated devices, or as small as a family plan having only a small number of associated devices.

The multiple subscriptions do not have to be the result of multiple separate contracts. For example, a single contract can permit a subscriber to access the network up to a certain number of times with a certain number of devices. This single contract can, in this way for example, be related to multiple subscriptions.

This approach can be used for both prepaid and postpaid (or online and off-line) charging solutions. In the case where a subscriber pays for a specific number of bytes in a "bucket", the subscriber can additionally pay for the ability to simultaneously deduct bytes from that bucket by performing transfers at a specific maximum number of different devices.

This mechanism can also leverage messaging which enables indicating to a second or roaming cellular network and/or charging system at least one of: support for the service, and one or more of the parameters associated with the service. Furthermore, the one or more parameters associated with the service may include at least one of: a number of subscriptions associated with a particular group of subscriptions, an identifier for the group of subscriptions, a list of the specific devices associated with this group subscription.

This approach can be applicable to both the uplink and the downlink, and may impact the QoS received during one or more of an upload and/or a download. In one embodiment the UE may be considered active if it is active on either the uplink or the downlink. This is more appropriate from the perspective that the network needs to maintain an RRC connection when there is activity on either the uplink or the downlink direction. In addition, the more currently RRC connected/active UEs there are within the group of subscriptions, the greater the overhead is for the cellular network. As a result, the UE will receive the higher QoS/priority when the total number of RRC connected UEs within the group is further minimized.

Alternatively, this mechanism could be applied independently to the uplink and downlink. For example, if only the first of 10 devices and a group subscription is currently active on the downlink, then the first device may receive a link speed which is approximately 10 times more than would be the case if all 10 of the devices were simultaneously active on the downlink. If, at the same time, only the third of the 10 devices is active on the uplink, then the third device may receive an uplink link speed which is approximately 10 times larger than would be the case if all 10 devices were simultaneously active on the uplink (regardless of/independent of any activity on the downlink). This approach may be more appropriate from a subscriber perspective, where the subscriber paid for a given amount of bandwidth on each of the uplink and downlink for each of a number of subscriptions. In this case, the subscriber may appreciate being able to utilize, for example, (almost) all of the subscription's uplink bandwidth at a first device, while utilizing (almost) all of the subscriptions downlink bandwidth with at a second device.

The method can also include, at 120, determining that related device(s) are not in use. There may be just one related device regarding which this determination is made, or a plurality of related devices. The related devices can be associated with same plurality of subscriptions. It is not necessary that these other devices actually exist in all embodiments, although in some embodiments the other devices may actually exist and just not be currently in use. For example, the subscriber may be entitled to connect five devices to a network but may only have three devices currently connected. In this case, two related devices may be determined not to be in use.

The related devices can be considered not to be in use if they are not actively transmitting or receiving more than a threshold amount of data, within a threshold time interval. For example, if the devices are merely idling or otherwise in an inactive state they may be considered to be not use. This activity threshold may be limited to data related to a user plane, in certain embodiments. The threshold may be set to be lower than would be used for streaming media, multiplayer gaming, or active web browsing, such as 10 MB per hour, 100 MB per hour, or 1 GB per hour. Other thresholds are also permitted. Alternatively, the threshold may be related to amount of data downloaded within a window of time, such as whether at least 1 MB of data has been downloaded within the last minute, last ten minutes, or the like. Other data amounts and window durations are permitted.

Other methods of determining whether the related devices are not in use are also permitted, such as detection of an RRC state of the device, a power state of the device, a recent average bit rate achieved on the uplink and/or downlink, or the like. Optionally, the subscriber may represent that the other devices are not in use, and the other devices may be prevented from using the subscription for as long as the subscriber represents that they are not in use. For example, the subscriber may be prompted to authorize use by only a single device of a set of subscribed devices, and may choose to do so, for example to boost the performance of the single device.

The method can further include, at 130, assigning a higher priority to the device. The assignment of a higher priority can be based on the determinations at 110 and 120. Thus, the assignment of higher priority can, in certain embodiments, occur only when those two determinations are positive, such that it is the case that a device has multiple associated subscriptions and at least one of those subscriptions is not being used.

The method can additionally include, at 125, determining that the at least one related device is in a same geographic area as the device. The assigning the higher priority can be further contingent on the determination that the at least one related device is in the same geographic area as the device. This determination of the region can be based on reported global positioning system (GPS) coordinates of the devices, tracking area or location area information regarding the devices, or reports by the device regarding the related devices. Other methods for determining the grouping of the devices is also permitted.

The assignment of the higher priority can involve assigning a higher quality of service or other mechanism that may permit a higher quality of experience (QoE), such as allowing the single device to use multiple radios simultaneously or to use greater bandwidth or bandwidth capable of greater data rates.

The method of FIG. 1 may be performed a network element such as a PCRF or entitlement server. The method may be a method of network determination of QoS in the context of multiple subscriptions. For example, a long term evolution (LTE) or similar network can provide higher priority for a first LTE connected UE, in response to detecting that the first connected UE is associated with more than one wireless subscription and more than one of this plurality of wireless subscriptions is not currently in use.

The network can determine that multiple subscriptions are associated with the first subscriber or first user equipment (UE). The network can determine how many of these multiple subscriptions are not currently being used to perform a transfer. If more than one of these subscriptions is not currently being used to perform a transfer, then the first wireless UE can be provided with a higher level of QoS, For example, in the case where there are two such subscriptions, the QoS provided can be commensurate with the bandwidth which would be provided to two UEs simultaneously performing transfers.

A first network element, such as an entitlement or charging server, can determine the number of subscriptions associated with a subscriber or specific LTE device, which are not currently being used for a transfer. If the first network element determines that this number is larger than a specific threshold, then the first network element can utilize a connection to the PCRF to then cause that UE to be provided with a higher level of QoS. Alternatively, the same functionality can be performed in other network devices or can be performed using a combination of network devices.

Certain embodiments may be applicable to a case where there is one active subscriber device associated with a group or to a case where there are multiple active subscriber devices associated with a group. There can be a variety of modifications associated with these various embodiments, of which the following are some non-limiting illustrative examples.

In an example where there is only one active subscriber device, the first network element can determine that a subscriber has X, for example five, subscriptions, and among these subscriptions, there are Y, for example four, not in use. Thus, X-Y devices are in use, in this case one.

In response to determining that Y is larger than one, or optionally at least one, the network can utilize the PCRF to cause the UE/transfer to be provided with a higher level of QoS, for example with a bit rate which is X/(X-Y) times larger, in this example five times larger.

In an example where there are multiple active subscriber devices, but there are more subscriptions than there are active devices within the group, the first network element can determine that a subscriber has X subscriptions, and among these subscriptions, there are Y not in use, and thus X-Y devices are in use. The values of X and Y in this example can be 5 and 3.

In response to determining that Y is larger than one, or optionally at least one, the network can utilize the PCRF to cause the UE/transfer to be provided with a higher level of QoS, for example with a bit rate which is X/(X-Y) times larger, in this example 5/2 times larger.

In a further embodiment, each of the X-Y devices may receive a bit rate commensurate with an equal fraction of that which would be normally provided to a group of X different active UEs.

Furthermore, this QoS enhancement for multi-subscription subscribers, may be provided conditionally. For example, the enhancement may be provided only if the multiple devices associated with the multiple subscriptions are in the same approximate location.

The network may be particularly incentivized in such a case to provide the QoS boost because the multi-subscription subscriber which is near its other devices, may already be able to capture/achieve the QoS boost without any network feature for cooperation by utilizing Wi-Fi or peer-to-peer signaling among its devices, to cause each of its devices to simultaneously and independently begin transfers with the cellular network.

If the devices on a subscription were to use such an approach, this would be less efficient from an RF and battery life perspective than the mechanism of certain embodiments and would result in multiple simultaneous/separate LTE connections.

Given that an individual subscriber will have a higher link speed as a result of certain embodiments, the group of devices may additionally be incentivized to coordinate such that a single LTE device within the group of co-located devices can perform an LTE transfer on behalf of multiple other UEs within the group. For example, the first LTE device may use Wi-Fi or other technology to coordinate with the other devices Such coordination may be beneficial as such coordination may avoid the need to have multiple concurrent LTE connections to the multiple devices. For example, the first UE may perform a higher speed transfer on behalf of other wireless devices. The LTE connection can also then be commensurately faster as it benefits the multiple devices.

The multiple devices may further coordinate such that the background transfers performed by the different devices within the group occur approximately simultaneously, so that a single LTE connection can perform the largest fraction of the transfer, thereby enabling avoiding as many disjoint LTE transfers as possible.

This prioritization mechanism may be further utilized by devices when the LTE network is particularly congested. In this case, the current drain required to perform the LTE transfers is particularly large as compared to the battery life drain required to do any additional transfers needed to distribute the transfer among the co-located devices.

In another embodiment, a Wi-Fi gateway can detect the number of individual subscribers communicating through an LTE UE. For example, the Wi Fi gateway can indicate to the PCRF the count of such subscribers. The PCRF may then provide an appropriately higher QoS.

Certain embodiments may provide various benefits and/or advantages. For example, certain embodiments may provide a better user experience of owning multiple subscriptions. Moreover, certain embodiments may aid in monetizing subscribers by automatically shifting multi-subscription subscribers into the mode of paying for performance.

With certain embodiments, the subscriber may be incentivized or rewarded for paying for additional wireless subscriptions. For example, a subscriber with five subscriptions starts downloading on one subscription, then it may now be that the single subscriber will receive a total of five times more bandwidth than would be the case if the single subscriber only had a single subscription.

Figure 2:
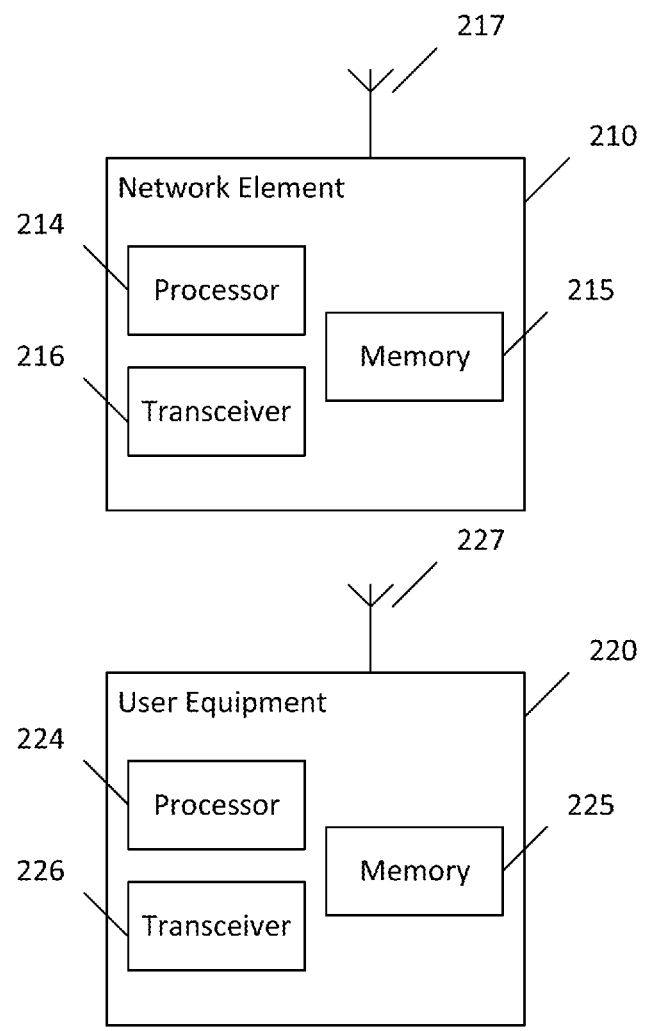
FIG. 2 illustrates a system according to certain embodiments of the invention.

FIG. 2 illustrates a system according to certain embodiments of the invention. It should be understood that each block of the flowchart of FIG. 1 may be implemented by various means or their combinations, such as hardware, software, firmware, one or more processors and/or circuitry. In one embodiment, a system may include several devices, such as, for example, network element 210 and user equipment (UE) or user device 220. The system may include more than one UE 220 and more than one network element 210, although only one of each is shown for the purposes of illustration. A network element can be a PCRF or entitlement server, or any other network element such as an access point, a base station, an eNode B (eNB).

Each of these devices may include at least one processor or control unit or module, respectively indicated as 214 and 224. At least one memory may be provided in each device, and indicated as 215 and 225, respectively. The memory may include computer program instructions or computer code contained therein, for example for carrying out the embodiments described above. One or more transceiver 216 and 226 may be provided, and each device may also include an antenna, respectively illustrated as 217 and 227. Although only one antenna each is shown, many antennas and multiple antenna elements may be provided to each of the devices. Other configurations of these devices, for example, may be provided. For example, network element 210 and UE 220 may be additionally or solely configured for wired communication, and in such a case antennas 217 and 227 may illustrate any form of communication hardware, without being limited to merely an antenna.

Transceivers 216 and 226 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One or more functionalities may also be implemented as a virtual application that is provided as software that can run on a server.

A user device or user equipment 220 may be a mobile station (MS) such as a mobile phone or smart phone or smart watch or multimedia device, a vehicle, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 220 may be a sensor or smart meter, or other device that may usually be configured for a single location.

In an exemplifying embodiment, an apparatus, such as a node or user device, may include means for carrying out embodiments described above in relation to FIG. 1.

Processors 214 and 224 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 215 and 225 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 210 and/or UE 220, to perform any of the processes described above (see, for example, FIG. 1). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 2 illustrates a system including a network element 210 and a UE 220, embodiments of the invention may be applicable to other configurations, and configurations involving additional elements, as illustrated and discussed herein. For example, multiple user equipment devices and multiple network elements may be present, or other nodes providing similar functionality, such as application servers or the like.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   determining that a device is associated with a plurality of subscriptions;
   determining at least one related device is not actively communicating, wherein the at least one related device is associated with same plurality of subscriptions; and
   assigning a higher quality of service to the device based on the determinations that the device has the plurality of associated subscriptions and has at least one related device not actively communicating.

2. The method of claim 1, wherein the determining that the device is associated with a plurality of subscriptions comprises determining that the device is assigned to a subscriber having a plurality of subscriptions.

3. The method of claim 2, wherein the subscriber comprises an individual subscriber or an enterprise subscriber.

4. The method of claim 1, wherein the subscriptions comprise wireless subscriptions.

5. The method of claim 1, further comprising:
   determining that the at least one related device is in a same geographic area as the device,
   wherein the assigning the higher quality of service is further contingent on the determination that the at least one related device is in the same geographic area as the device.

6. The method of claim 1, wherein the method is performed by at least one of a policy and charging rules function or an entitlement server.

7. An apparatus, comprising:
   means for determining that a device is associated with a plurality of subscriptions;
   means for determining at least one related device is not actively communicating, wherein the at least one related device is associated with same plurality of subscriptions; and means for assigning a higher quality of service to the device based on the determinations that the device has the plurality of associated subscriptions and has at least one related device not actively communicating.

8. The apparatus of claim 7, further comprising:
means for determining that the at least one related device is in a same geographic area as the device,
wherein the assigning the higher quality of service is further contingent on the determination that the at least one related device is in the same geographic area as the device.

9. The apparatus of claim 7, wherein the apparatus comprises at least one of a policy and charging rules function or an entitlement server.

10. An apparatus, comprising:
at least one processor; and
at least one memory including computer program code,
wherein the at least one memory and the computer program code are configured to, with the at least one processor, cause the apparatus at least to
determine that a device is associated with a plurality of subscriptions;
determine at least one related device is not actively communicating, wherein the at least one related device is associated with same plurality of subscriptions; and
assign a higher quality of service to the device based on the determinations that the device has the plurality of associated subscriptions and has at least one related device not actively communicating.

11. The apparatus of claim 10, wherein the at least one memory and the computer program code are configured to, with the at least one processor, cause the apparatus at least to determine that the at least one related device is in a same geographic area as the device, and
wherein the assignment of the higher quality of service is further contingent on the determination that the at least one related device is in the same geographic area as the device.

* * * * *